Sept. 9, 1969     E. B. BRUMFIELD     3,465,920

COFFEE DISPENSER

Filed May 10, 1968

INVENTOR.
Elmer B. Brumfield
BY
ATTORNEY.

United States Patent Office 3,465,920
Patented Sept. 9, 1969

3,465,920
COFFEE DISPENSER
Elmer B. Brumfield, 1136 W. Long St.,
Stephenville, Tex. 76401
Filed May 10, 1968, Ser. No. 728,177
Int. Cl. B67d 5/38; G01f 11/28; B65d 47/00
U.S. Cl. 222—154                              1 Claim

ABSTRACT OF THE DISCLOSURE

A friction type cover formed of molded plastic material, for application to a cylindrical container, such as a coffee can, having incorporated therein dispensing means comprising an upstanding, transparent measuring and pouring spout, positioned adjacent one side of the cover, having a spring biased sliding gate normally closing its inner end and a spring tensioned hinged closure normally closing its outer end.

---

This invention relates to a coffee dispenser, and it concerns more particularly a friction type cover formed of molded plastic material, for application to a cylindrical container, such as a coffee can, having incorporated therein dispensing means as hereinafter described.

The dispensing means above mentioned comprises an upstanding, transparent measuring and pouring spout, positioned adjacent one side of the cover, having a spring biased sliding gate normally closing its inner end and a spring tensioned hinged closure normally closing its outer end.

At least one brand of roasted and ground coffee, suitable for use in percolators and other coffee makers, is now marketed in a vacuum packed can, and a friction type cover formed of molded plastic material is provided for application to the can upon removal of one of its ends, as with a can opener.

The plastic cover above described keeps the can tightly closed, to keep out atmospheric air and to prevent loss to the atmosphere of the fragrant aroma of the freshly roasted coffee.

A disadvantageous feature of the plastic cover is that it is difficultly engageable with the ends of the fingers, to remove it, and it must be removed from the can to provide access to the contents thereof, as in withdrawing measured amounts of coffee for use.

An advantageous feature of this invention is that the cover remains in place at all times, and it is possible to withdraw measured amounts of coffee from the can, as desired, without removing the cover whereby atmospheric air is kept out of the can and evaporation of the odor and flavor of the freshly roasted coffee is prevented.

Figure 1:
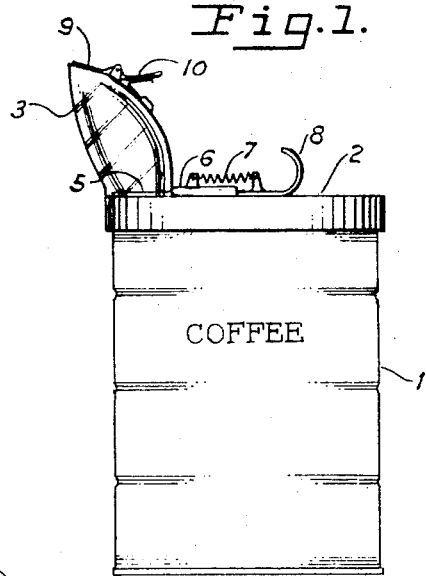
Figure 2:
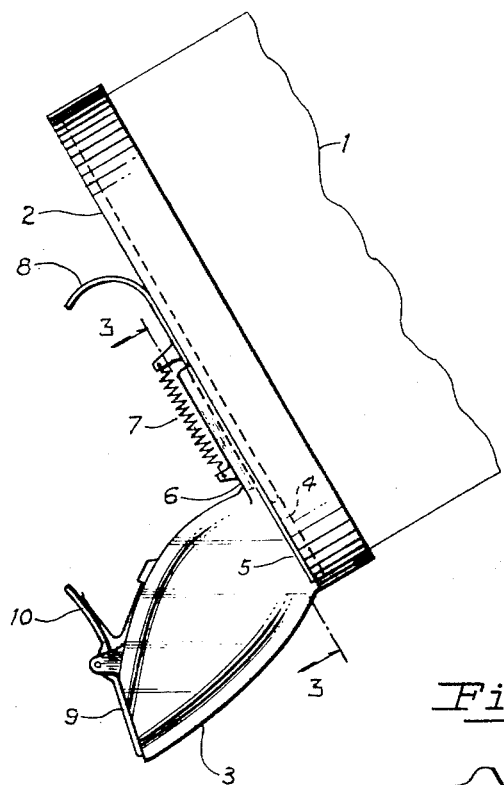
Figure 3:
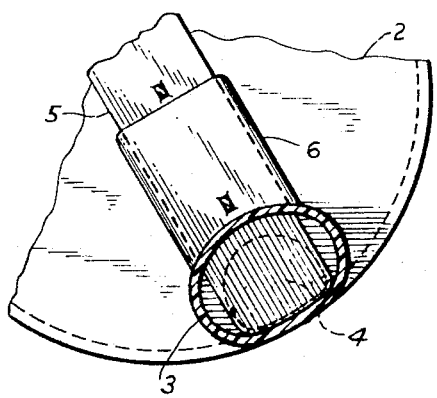

The invention will be readily understood by referring to the following description and the accompanying drawing, in which:

FIG. 1 is a side elevational view of a cylindrical container, specifically a coffee can, having applied thereto a plastic friction type cover embodying the invention;

FIG. 2 is a fragmentary side elevational view on an enlarged scale, substantially actual size, showing the upper portion of the container, and the plastic friction type cover of the invention, substantially as illustrated in FIG. 1, showing the container in tilted position preparatory to removing measured predetermined amounts of coffee therefrom, as by pouring; and FIG. 3 is a fragmentary sectional plan view taken on the line 3—3 of FIG. 2.

Referring to the drawing, the numeral 1 designates generally a cylindrical container, specifically a coffee can, which is open at the top and has applied thereto a friction type cover embodying the invention, as hereinafter described, which is indicated generally by the numeral 2.

The friction type cover 2 is formed of molded plastic material characterized by a degree of flexibility and elasticity whereby it frictionally engages the adjacent peripheral edge of the container 1, securely gripping it whereby it resists accidental displacement therefrom.

The plastic friction type cover 2 has incorporated therein dispensing means comprising an upstanding, transparent measuring and pouring spout as hereinafter described, indicated generally by the numeral 3, which is positioned adjacent one side of the cover 2.

The measuring and pouring spout 3, which is integral with the cover 2 and is formed of transparent, plastic material, is elongated and its transverse dimension is progressively reduced in the direction of its outer end.

The inner end of the measuring and pouring spout 3 surrounds a discharge opening 4 in the cover 2 which is normally closed by a sliding gate 5, which consists of an elongated strip, preferably metal, which is arranged diametrically of the cover 2 and is slidable relative to a slot therefor in a built up portion of the cover 2, indicated by the numeral 6, immediately adjacent the discharge opening 4.

A tension spring 7 acts on the sliding gate 5 and the cover 2 whereby the sliding gate 5 is biased in its closed position.

The sliding gate 5 has a finger grip 8 on the end thereof opposite the discharge opening 4, whereby the gate 5 is adapted to be opened, against the resistance of the spring 7.

The outer end of the measuring and pouring spout 3 is normally closed by a spring tensioned hinged closure 9, which is connected by its hinge to one side of the spout 3 and is normally biased in its closed position by the action of its spring.

A lateral extension of the hinged closure 9, indicated by the numeral 10, which extends beyond the hinge whereby the closure 9 is connected to the spout 3, is engageable by the thumb, to open the closure 9, against the resistance of its spring.

The dimensions of the measuring and pouring spout 3 advantageously may be such that the spout 3, in the closed positions of the sliding gate 5 and the hinged closure 9, will hold a measured, predetermined amount of coffee corresponding substantially to the amount needed to brew a single cup of coffee, as in a percolator or other coffee maker.

The sliding gate 5 may be opened in any degree, and the degree of opening of the gate 5, as well as the contents of the spout 3, may be readily determined by visual inspection.

I claim:

1. A friction type cover formed of molded plastic material, for application to a cylindrical container, such as a coffee can, having incorporated therein dispensing means comprising an upstanding, transparent measuring and pouring spout, positioned adjacent one side of the cover, having a spring biased sliding gate normally closing its inner end and a spring tensioned hinged closure normally closing its outer end, the spout being elongated and its transverse dimension being progressively reduced in the direction of its outer end, and the dimensions of the spout being such that, in the closed positions of the sliding gate and the hinged closure, it is adapted to hold a measured, predetermined amount of coffee corresponding substantially to the amount needed to brew a single cup of coffee, as in a percolator or other coffee maker, the inner end of the spout surrounding a discharge opening in the cover normally closed by the gate, and the gate consisting of an elongated strip arranged diametrically of the cover and slidable longitudinally relative to a slot therefor in a built up portion of the cover, immediately adjacent the discharge opening, a tension spring acting on the sliding gate and the cover whereby the sliding gate is biased in its closed position, and the sliding gate having a finger grip on the end thereof opposite the discharge opening whereby the gate is adapted to be opened, against the resistance of the spring, the arrangement being such that the gate may be opened in any degree, and the position of the gate, as well as the contents of the spout, may be readily determined by visual inspection.

References Cited

UNITED STATES PATENTS

| | | | |
|---|---|---|---|
| 252,759 | 1/1882 | Goodyear | 222—156 X |
| 868,641 | 10/1907 | Clark | 222—449 X |
| 889,738 | 6/1908 | Weber | 222—450 X |
| 2,873,050 | 2/1959 | Halverson | 222—449 X |
| 3,372,832 | 3/1968 | Yeater et al. | 222—570 X |

ROBERT B. REEVES, Primary Examiner

N. L. STACK, JR., Assistant Examiner

U.S. Cl. X.R.

222—450, 561